May 1, 1951     L. ROLLAND     2,551,167
CUTTING TOOL
Filed May 3, 1947
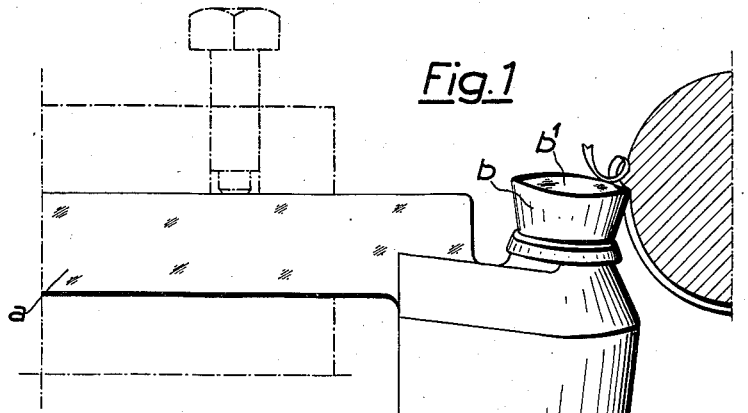
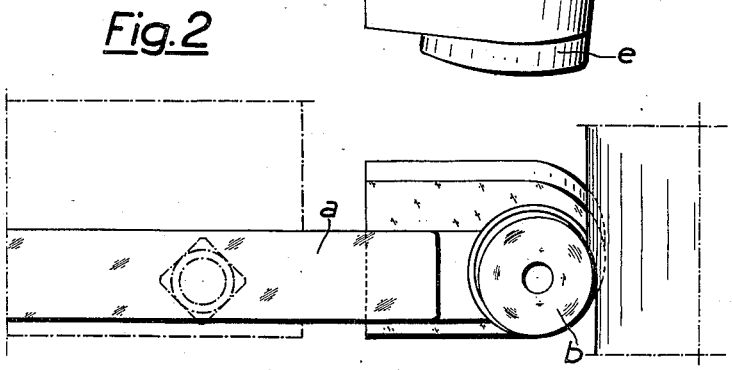
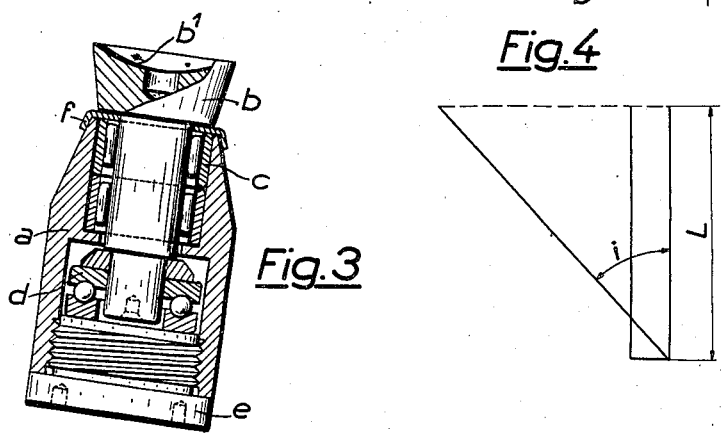
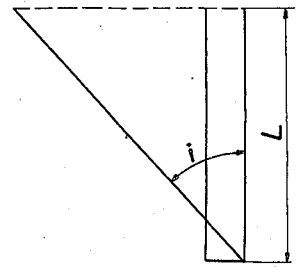
INVENTOR.
LUCIEN ROLLAND
BY
Hazeltine, Lake & Co.
AGENTS

UNITED STATES PATENT OFFICE 2,551,167

CUTTING TOOL

Lucien Rolland, Roanne, Loire, France

Application May 3, 1947, Serial No. 745,797
In France April 14, 1943

Section 1, Public Law 690, August 8, 1946
Patent expires April 14, 1963

4 Claims. (Cl. 29—96)

In the cutting of metals the cutting speeds obtained by the best high speed steel tools have up to the present not exceeded 40 metres during rough cutting or at the most 80 metres during finish cutting. These speeds have been doubled by the use of metallic carbides, but all efforts to obtain still greater cutting speeds have been commercially unsuccessful. This has been due primarily to the fact that the cutting edge or surface is insufficiently cooled, a temperature being very rapidly reached which is such that the tool is destroyed.

The present invention has for its primary object to eliminate such rise of temperature and to this end consists in the use of a tool having a circular cutting edge, the tool being automatically rotated by the engagement of said cutting edge with the work whereby said edge is progressively and continuously cooled.

The cutting speed which can be thus attained with ordinary high speed steels is about 300 metres during rough cutting and it is expected that this can be exceeded, especially when high speed steel is replaced by carbide steel. The speeds obtained during finish cutting are increased to the same extent. Furthermore, the possibility of using cast steel or other cutting metal may be very apperciably improved by this process.

The cutting tool is very simple to construct and its mounting is such that it can be removed and replaced without any special tools. The tool holder also is simple and inexpensive to make.

The annexed drawings show by way of example one embodiment of the invention. In said drawings:

Figure 1 is a side elevation adapted for use with a lathe;

Figure 2 is a plan view of Figure 1;

Figure 3 is a vertical section on a larger scale showing the tool mounting arrangement; and Figure 4 is a diagrammatic view illustrating the method of operation of the tool.

Referring now to the drawings, a tool carrier $a$ is shown which is adapted to be attached to a turret or other suitable mounting device. A cylindrical tool $b$ which is freely rotatable in the tool carrier, is formed with a peripheral cutting edge and with a relief surface $b'$ which forms with the outer surface of the tool a clearance angle.

Needle bearings $c$ or the like and a thrust ball race $d$ serve to support the tool within the carrier. A threaded plug $e$ enables the ball race $d$ to be located and adjusted and a cover $f$ prevents metal shavings or dust and cooling liquid from entering the bearings.

In operation, the cylindrical and rotatable tool $b$ is positioned opposite the work with its axis inclined both towards and in the direction of the work axis, as shown in Figures 1 and 2. Due to the pressure of the shaving cut from the work, the tool $b$ is rotatively driven about its axis, this movement being entirely automatic and requiring no accessory driving system. It will be evident that the cutting action is continuously produced over the entire circular cutting edge and that said edge is progressively cooled by its passage through the air or through a jet of cooling liquid. At the same time, due to the rotation of the tool, the friction produced between the work and the tool is reduced as compared with a stationary tool, resulting in less wear and in particular a lesser degree of heating. This speed of friction of the shaving is a component of the respective speeds of the work and the tool.

Thus designed and carried into effect, the cutting operation no longer takes place under ordinary known conditions; further, the cutting zone is no longer normal but oblique, and consequently the work produced by the cutting edge is diminished.

Considering a piece of metal shaving of length L cut off in one second, the work necessary to effect the cut being equal to T, then in the case of an ordinary tool, the mean effort is $$F=\frac{T}{L}$$

with the cylindrical rotatable tool of this invention the relative trajectory of a point on the cutting edge being oblique with inclination $i$ the knife appears to have travelled over the distance $$\frac{L}{\cos i}$$

whence the effort required is $$F=\frac{T \cos i}{L}F$$

All these considerations, namely, the reduced friction of the shaving on the tool, the reduced cutting effort etc., have the effect of producing a cut with much less power than that required under known conditions.

The shaving cut from the work is not annealed and is but little split even at very high speeds, which is a most convincing fact of this improved conception of cutting.

The bearings supporting the cutter may be of the ball or roller kind or may comprise Timken pins or pins of a Timken nature, or they may be simple smooth bearings with or without lubrication.

As will be evident from the foregoing, the invention is in no way restricted either to the method of application or to its construction, numerous alternatives being possible within the purview of the annexed claims.

I claim:

1. High speed metal cutting tool comprising a support, a cylindrical member including a flaring end freely and revolubly journalled in said support with its axis inclined both towards the work axis and in the feed direction of the work relative to the said member, an outwardly concave surface at the flaring end of said member forming with the cylindrical surface thereof a circular acute cutting edge engageable with the work and thereby to produce rotation of said member by rotation of the work, the cylindrical surface being arranged to form a cutting angle relative to the work axis and the end surface of said member forming a relief angle relative to the work axis.

2. A high speed metal cutting tool comprising a support, a hollow one-part cylindrical member radial and thrust bearings carried coaxially inside said cylindrical member, the axis of said cylindrical member and bearings being inclined towards the work, means for axially adjusting the thrust bearing, a cylindrical tool member including a flaring end and freely and revolubly journalled in said bearings and an inwardly concave relieved surface at one end of said member forming with the cylindrical surface thereof an acute cutting edge.

3. A high speed metal cutting tool comprising a support, a hollow cylindrical member, radial and thrust bearings carried coaxially inside said cylindrical member, the axis of said cylindrical member and bearings being inclined towards the work, means for axially adjusting the thrust bearing, a cylindrical tool member including a flaring end and freely and revolubly journalled in said bearings and an outwardly concave relieved surface at one end of said member forming with the cylindrical surface at the flaring end thereof an acute cutting edge and providing with said cylindrical surface a clearance angle to receive the metal removed from the work.

4. A high speed metal cutting tool comprising a support, a hollow cylindrical member, radial and thrust bearings carried coaxially inside said cylindrical member, the axis of said cylindrical member and bearings being inclined towards the work, a cover fitted over the support on the outside of the thrust bearing and threaded into the cylindrical member for adjustably defining the location of said thrust bearing, a cylindrical tool member including a flaring end and freely and revolubly journalled in said bearings and an inwardly relieved surface at one end of said member forming with the cylindrical surface thereof an acute cutting edge.

LUCIEN ROLLAND.

REFERENCES CITED

The following references are of record in the file of this patent:

UNITED STATES PATENTS

| Number | Name | Date |
|---|---|---|
| 543,551 | Hartness | July 31, 1895 |
| 1,516,269 | Drissner | Nov. 18, 1924 |
| 1,535,028 | Muller | Apr. 21, 1925 |
| 1,954,511 | Adams | Apr. 10, 1934 |
| 2,054,311 | Adams | Sept. 15, 1936 |
| 2,127,523 | Kraus | Aug. 23, 1938 |
| 2,233,724 | Bannister | Mar. 4, 1941 |
| 2,237,744 | Mullen | Apr. 8, 1941 |

FOREIGN PATENTS

| Number | Country | Date |
|---|---|---|
| 16,893 | Great Britain | 1913 |
| 781,481 | France | Feb. 25, 1935 |
| 805,981 | France | Dec. 4, 1936 |